United States Patent [19]
Helbing et al.

[11] Patent Number: 5,905,363
[45] Date of Patent: May 18, 1999

[54] METHOD FOR REDUCING THE INTERNAL RESISTANCE OF RECHARGEABLE BATTERIES

[75] Inventors: Ralf Helbing, Nördlingen; Manuel Agulla, Essen, both of Germany

[73] Assignee: GM Racing Modellsportvertrieb GmbH, Nordlingen-Baldlingen, Germany

[21] Appl. No.: 08/973,841

[22] PCT Filed: Apr. 24, 1996

[86] PCT No.: PCT/EP96/01710

§ 371 Date: Dec. 17, 1997

§ 102(e) Date: Dec. 17, 1997

[87] PCT Pub. No.: WO97/40544

PCT Pub. Date: Oct. 30, 1997

[51] Int. Cl.$^6$ .................................................. H01M 10/44
[52] U.S. Cl. .............................................................. 320/131
[58] Field of Search .................................... 320/100, 125, 320/128, 139, 141, 131, FOR 101, FOR 119, FOR 137, DIG. 16

[56] References Cited

U.S. PATENT DOCUMENTS

| | | | |
|---|---|---|---|
| Re. 35,643 | 10/1997 | Gali | 320/100 X |
| 4,829,225 | 5/1989 | Podrazhansky | |
| 5,063,341 | 11/1991 | Gali | |

FOREIGN PATENT DOCUMENTS

| | | |
|---|---|---|
| A0 135 275 | 3/1985 | European Pat. Off. . |
| AP 616 410 | 9/1994 | European Pat. Off. . |
| A03 203523 | 11/1991 | Japan . |
| A06 070478 | 3/1994 | Japan . |
| A677 560 | 5/1991 | Switzerland . |

*Primary Examiner*—Edward H. Tso
*Attorney, Agent, or Firm*—Jaeckle Fleischmann & Mugel, LLP

[57] ABSTRACT

The invention relates to a method for reducing the internal resistance ($R_i$) of rechargeable accumulators, in particular nickel-cadmium accumulators, wherein an electric energy source is connected with the poles (±) of the accumulator, which is adapted for outputting an electric energy of at least the 40-fold product of the absolute value of the short-circuit current ($I_K$) and the absolute value of the nominal voltage of an untreated accumulator and wherein the accumulator is subjected to the energy for a predetermined time period.

17 Claims, 1 Drawing Sheet

METHOD FOR REDUCING THE INTERNAL RESISTANCE OF RECHARGEABLE BATTERIES

The present invention relates to a method for reducing the internal resistance of rechargeable accumulators, in particular nickel-cadmium accumulators. However, the invention relates also to the application of the method to other types of accumulators (nickel-metallic hydride, lithium ion accumulators and the like). In addition, the invention relates to such accumulators that can be obtained by the inventive method. The term "accumulator" is used throughout the specification and has the same meaning as the more conventional term "battery".

For reducing the capacity of rechargeable accumulators, various methods are known in the state of the art. Most of these methods are based on controlling the charging current or the charging voltage with respect to time and absolute value during the charging operation of the accumulator. Moreover, special discharging devices ensure the complete discharge of the accumulator prior to its recharging.

All these methods and approaches for the treatment of rechargeable accumulators, however, have in common that the accumulators are charged by means of relatively low voltages and currents.

In view of this, the invention is based on the object to increase the capacity of the accumulators per se.

For this purpose, the invention utilizes the surprising finding that it is possible to reduce the internal resistance of accumulators.

According to the invention, the poles of the accumulator are connected with an electrical energy source which is adapted to output an electrical energy of at least the 40-fold product of the absolute value of the short-circuit current and of the absolute value of the nominal voltage of an untreated accumulator. According to a preferred embodiment of the inventive method, the energy source is a d.c. voltage source, the positive terminal of which is connected with the anode of the accumulator and the negative terminal of which is connected with the cathode of the accumulator. It is, however, also possible to reverse the polarity so that the positive terminal is connected with the cathode of the accumulator and the negative terminal is connected with the anode of the accumulator. Alternatively, the energy source can be an a.c. voltage source as well.

According to the invention, the energy source is connected with the accumulator for at least one millisecond.

It is also possible to repeatedly switch the energy source off and on so that the accumulator is supplied several times with electric energy.

The energy source is preferably adapted for an output of at least 1.5 times the short-circuit current and approx. 30 times the nominal voltage of the accumulator. In order to improve the inventive effect, the energy source is adapted for an output of at least 1.5 times the short-circuit current and approx. 40 times the nominal voltage of the accumulator. According to a currently particularly preferred embodiment, the energy source is adapted for an output of at least 60 times the short-circuit current and approx. 40 times the nominal voltage of an accumulator with six individual cells. For a nickel-cadmium accumulator with a nominal voltage of 7.2 V and a short-circuit current of approx. 150 A, this means a d.c. voltage of approx. 300 V at approx. 10 kA.

The energy source is preferably connected with the accumulator for approx. 1 $\mu$sec.

The voltage or the current, respectively, can be increased in order to enhance the desired effect of reducing the internal resistance. If problems occur in conjunction with the heating of the accumulator during its treatment, the accumulator can be suitably cooled.

This is preferably done by immersion in a liquid (oil, frigen, liquid nitrogen or the like).

The energy source is preferably connected with the accumulator for at least 2 msec. In addition to the above mentioned cooling of the accumulator in order to avoid an undesired or detrimental heating of the accumulator, the energy source can also be repeatedly switched on and off, thereby dividing the treatment of the accumulator into several time-sequential sections. A pulsed treatment of the accumulator with 2 to 200 pulses of a duration of approx. 1 $\mu$sec to 2.5 msec each also yields the desired inventive result.

According to the invention, either each individual cell of the accumulator (if required, also prior to the assembly of several individual accumulator cells to form an accumulator package) can be treated according to the above method, or an assembled accumulator package consisting of several individual accumulator cells is treated subsequent to assembly. In the latter case the current and/or the voltage is increased depending on whether a parallel connection and/or a series connection of several accumulator cells is involved.

The inventive method achieves particularly good results when subjecting brand new accumulators to the inventive method or such accumulators which have undergone not more than 10, preferably 2 to 3 charging and discharging operations.

The invention also relates to an accumulator, in particular to a nickel-cadmium accumulator which can be obtained by the above described method or its modifications, whose internal resistance is reduced.

Finally, the invention relates to an energy source which is suitable for carrying out the method. In order to be able to provide the necessary high currents and voltages for the desired time periods it is advantageous if the energy source comprises a capacitor arrangement, the capacitance and dielectric strength of which are selected in such a manner that it can output the electric energy (for the short time period) to the accumulator. Due to the fact that a capacitor arrangement C is discharged via a resistor R (here the internal resistance of the accumulator) in a defined manner, the engergy content supplied to the accumulator can be determined in a very simple and time-defined manner (time constant $\tau = R \cdot C$). As an alternative there is also the possibility to directly withdraw the energy from the electrical network by means of suitable semi0conductor switches and a corresponding driver circuit.

Further properties, advantages and characteristics of the invention will be explained in the following description with reference to a presently preferred embodiment.

Figure 1:
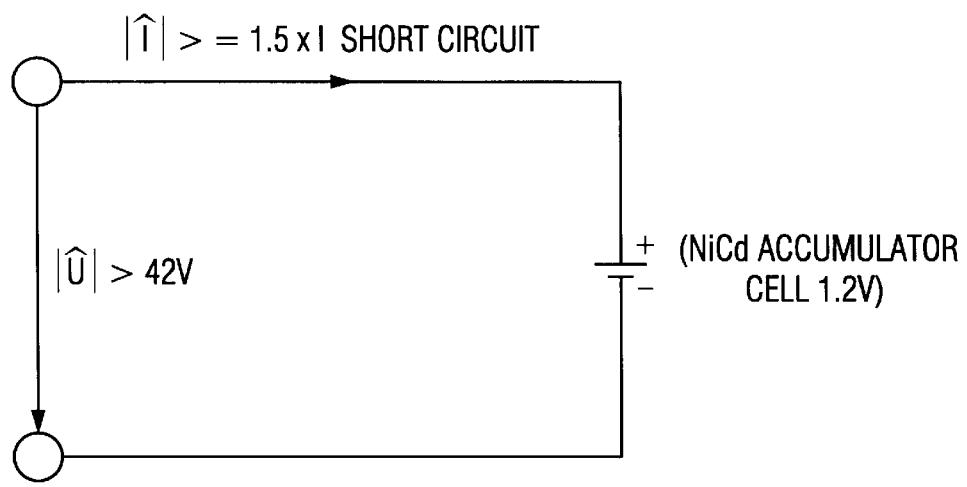
FIG. 1 shows a basic circuit diagram according to which an accumulator is connected with an energy source.

As shown in FIG. 1, a nickel-cadmium accumulator cell (with a nominal voltage of 1.2 V) is connected with an energy source which is capable of outputting a voltage with an absolute value of at least 42 V and a current with an absolute value of at least 1.5 times the short-circuit current $I_K$. Tests have shown that the inventive effect of reducing the internal resistance of the accumulator cell takes place at approx. 60 V d.c. and approx. 255 A d.c. if this energy (13.5 kW) is applied for approx. 2 msec to the nickel-cadmium cell. According to a presently preferred variant 300 V d.c. with approx. 10 kA d.c. are applied to the nickel-cadmium cell for 2 msec.

Figure 2:
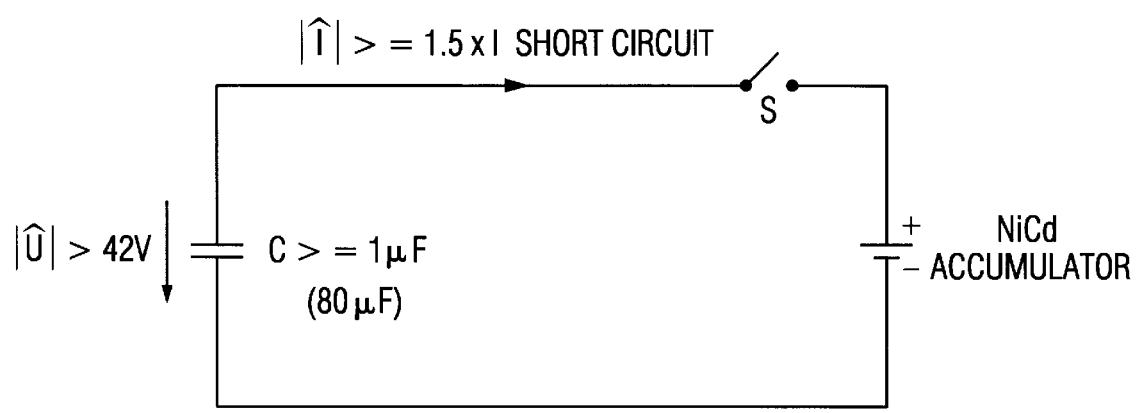
FIG. 2 shows a basic circuit diagram of an inventive energy source for carrying out the inventive method.

FIG. 2 shows a possible circuit arrangement for carrying out the inventive method. In order to be able to provide the required current with the desired high voltage for the inventive treatment of the accumulator, the illustrated capacitor arrangement has a capacitance of approx. 80 $\mu$F to approx. 250 mF (preferably approx. 7 mF) at a dielectric strength of approx. 500 V. A switch S which connects the nickel-cadmium accumulator with the capacitor arrangement C can be designed as a manually operable circuit breaker or as an electronically controllable power semiconductor switch. The capacitor arrangement C is charged (in a manner not shown explicitly) from the electrical network via a rectifier.

A nickel-cadmium accumulator which, according to the invention, is subjected to approx. 10 kA d.c. at 300 V d.c. for 0.2 to 5 msec will have an output voltage (per individual cell) in the subsequent operation which is increased by 20 mV at a discharging current of 20 A. This corresponds to an internal resistance $R_i$ which is reduced by 1 m$\Omega$.

Modifications of the inventive method (treatment with higher current, higher voltage, longer time duration of the treatment or pulsed application of electric energy to the accumulator) are possible in the above described manner and are covered by the spirit of the invention. The inventive circuit (FIG. 2) can also be replaced by another energy source without departing from the spirit of the invention, provided that the energy source supplies the energy in the inventively described manner.

We claim:

1. A method for reducing the internal resistance ($R_i$) of rechargeable solid nickel-cadmium or nickel-metallic hydride batteries comprising the steps of:

storing a charge of electrical energy corresponding to at least 40 times the product of the absolute value of the short-circuit current ($I_K$) and the absolute value of the nominal voltage of the battery;

applying the stored charge across the terminals of the battery for a predetermined period of time.

2. The method according to claim 1, wherein the energy source is a d.c. voltage source the positive terminal (+) of which is connected with the anode of the accumulator and the negative terminal (−) of which is connected with the cathode of the accumulator.

3. The method according to claim 1, wherein the energy source is a d.c. voltage source, the positive terminal of which is connected with the cathode of the accumulator and the negative terminal of which is connected with the anode of the accumulator.

4. The method according to claim 1, wherein the energy source is an a.c. voltage source with two output terminals, one each of which is connected with the anode or the cathode, respectively, of the accumulator.

5. The method according to one of claims 1 to 4, wherein the energy source is connected with the accumulator for at least one microsecond (1 $\mu$sec) in order to subject same to the electric energy.

6. The method according to claim 5, wherein the energy source is repeatedly and alternately switched on and off.

7. The method according to one of claims 1 to 4, characterized in that the energy source is adapted for outputting at least 1.5 times the short-circuit current ($I_K$) and approx. 40 to 30 times the nominal voltage of the accumulator.

8. The method according to claim 7, wherein the energy source is adapted for outputting at least 1.5 times the short-circuit current ($I_K$) and approx. 40 times the nominal voltage of the accumulator.

9. The method according to claim 8, wherein the energy source is adapted for outputting at least 60 times the short-circuit current and approx. 300 times the nominal voltage of the accumulator.

10. The method according to claim 1, wherein the energy source is connected with the accumulator for at least 1 $\mu$sec in order to subject same to the electrical energy.

11. The method according to claim 10, characterized in that the energy source is repeatedly and alternately switched on and off.

12. The method according to claim 1, wherein each cell of an accumulator comprising several cells is treated individually.

13. The method according to claim 1, wherein several cells are treated in parallel, with the current being increased according to the number of cells.

14. The method according to claim 1, wherein several cells are treated serially connected, with the voltage being increased according to the number of cells.

15. The method according to claim 1, wherein brand new accumulators are used as the accumulators.

16. An accumulator, in particular a nickel-cadmium accumulator, obtainable by the method according to claim 1.

17. An energy source for carrying out the method according to claim 1, comprising a capacitor arrangement the capacitance and dielectric strength of which are selected in such a manner that it can output the required electrical energy to the respective accumulator.

* * * * *

UNITED STATES PATENT AND TRADEMARK OFFICE
CERTIFICATE OF CORRECTION

PATENT NO. : 5,905,363
DATED : May 18, 1999
INVENTOR(S) : Ralf Helbing and Manuel Agulla It is certified that error appears in the above-indentified patent and that said Letters Patent is hereby corrected as shown below:

In claim 1, on the second line thereof, delete "solid."

Signed and Sealed this

Sixteenth Day of November, 1999

Attest:

Q. TODD DICKINSON

Attesting Officer     Acting Commissioner of Patents and Trademarks